United States Patent

[11] 3,576,193

[72] Inventors Neal B. Rothfuss;
 Frederick Kaiser, Clinton, N.Y.
[21] Appl. No. 832,110
[22] Filed June 11, 1969
[45] Patented Apr. 27, 1971
[73] Assignee The Bendix Corporation

[54] HIGH FLOW REGULATING AND RELIEF VALVE
 3 Claims, 2 Drawing Figs.
[52] U.S. Cl. .................................................. 137/116.5,
 137/505.13, 137/505.18, 137/505.41, 137/505.12, 137/613
[51] Int. Cl. ........................................................ G05d 11/00,
 F16k 31/12
[50] Field of Search ............................................ 137/116.3,
 116.5, 505.11, 505.12, 505.13, 613

[56] References Cited
 UNITED STATES PATENTS
1,214,445  1/1917  Fausek et al. .................. 137/505.11X
1,477,244  12/1923 Collins et al. .................... 137/613X
2,002,884  5/1935  Deming ........................... 137/505.12
2,192,042  2/1940  Hoffmann ....................... 137/505.13X
3,153,424  10/1964 Acker et al. ..................... 137/505.11X
3,425,442  2/1969  Johnson et al. ................. 137/505.15

Primary Examiner—Laverne D. Geiger
Assistant Examiner—David J. Zobkiw
Attorneys—Robert A. Benziger and Plante, Arens, Hartz, Hix and Smith ABSTRACT: A regulating and relief valve is disclosed characterized by being able to provide two stages of regulation. The first stage of regulation controls total fluid flow to the fluid pressure regulating second stage. This permits the valve to interface between a high-flow (or high-pressure) source and a utilization means requiring greatly reduced maximum pressures.

PATENTED APR 27 1971   3,576,193

FREDERICK A. KAISER
NEAL B. ROTHFUSS
INVENTORS

BY Robert A. Benziger

HIGH FLOW REGULATING AND RELIEF VALVE

BACKGROUND OF THE INVENTION

1. Field of the Invention

The present invention relates to regulating valves in general and to regulating valves for aircraft deicer systems in particular.

2. Description of the Prior Art

The prior art regulating valves for aircraft deicer systems are designed to interface with pressurized sources so as to produce a certain regulated output pressure, having a maximum output pressure on the order of 20 p.s.i.g., to be applied to the aircraft deicing boots. The maximum output pressure is critical as excessive pressure will rupture the boots or separate them from the aircraft. Either of these situations is extremely dangerous as either situation would seriously alter the aerodynamic characteristics of the aircraft. In order to prevent overpressurization, the prior art valves are equipped with relief means, responsive to output pressure, to vent the downstream side of the valve to a low-pressure dump (usually the atmosphere in pneumatic systems) to prevent boot damage. However, as pneumatic and hydraulic power operated accessories are increasing in usage and in pressure demands the pressure output of aircraft pressurizing systems is gradually being increased both for new aircraft and for existing aircraft. This presents a potential safety hazard since, while regulating valves are generally capable of providing a controlled output pressure regardless of input pressure, the relief valve function is generally designed to handle a worst situation condition of venting a portion of the output pressure to atmosphere while maintaining the output pressure available to the deicer boots at or near the regulated pressure when the regulating valve is jammed wide open. Of course, whenever input pressures are increased, the relief valve means immediately become inadequate. It is, therefore, an object of this invention to provide, in a regulating and relief valve, a means for permitting the valve to operate successfully with a wide range of input pressures. Furthermore, in order to provide a regulating and relief valve suitable for use in presently existing aircraft, it is a further object of the present invention to provide such a feature in a regulating and relief valve capable of fitting present size and space restrictions.

The known prior art devices have relied upon sensing of the fluid pressure downstream of the valve in order to control the regulating and overpressure relief functions which are necessary in such a valve. The state of the art of pressurizing systems for aircraft use is such that downstream sensing is not completely adequate to provide system protection for aircraft deicer boots and the like since a system failure will readily result in a drastic alteration of the aerodynamics of the associated aircraft such that the aircraft goes into a crash configuration. It is, therefore, necessary to provide a means for sensing fluid pressure upstream of the valve and of utilizing such information to assist the regulating and relief valve to perform its function while reducing the potential for adverse effects to the pressure utilization system downstream of the valve. It is an object of the present invention to provide a means of reducing a high-pressure fluid input to the region of pressure acceptable to the prior art regulating and relief valves. Keeping in mind the increasing use of high-pressure fluid systems and the increase in pressure output of fluid sources, it is a further object of the present invention to provide a means of controlling the output of a high-pressure source which means is capable of inclusion in the prior art regulating valve housings without requiring fluid system alterations. It is a still further object of the present invention to provide a complete regulating valve for retrofit in aircraft deicer systems utilizing higher pressure sources than originally called for by the aircraft specifications.

Since fluid pressure and fluid flow in a given system may be directly related, it is a still further object of the present invention to provide a flow-throttling valve upstream of the pressure regulating valve in an aircraft deicer regulatory valve to limit the fluid pressure which the valve must regulate to a region in which the relief function will provide complete protection in the worst situation.

SUMMARY OF THE INVENTION

We have found that a castellated or fluted valve cylinder, responsive to input pressure, may be incorporated in a regulating valve of the above-described character to limit or throttle the flow of fluid to the regulating valve seat so that the regulating and relief functions will be satisfactorily performed. The throttling valve is spring biased away from the valve seat and, in the presence of input pressure in excess of a predetermined amount, will be urged toward the valve seat until it surrounds the valve seat and abuts a stop at which point the castellations provide a reduced flow area through which pressurized fluid flow is throttled.

DETAILED DESCRIPTION OF THE PREFERRED EMBODIMENT

Figure 1:
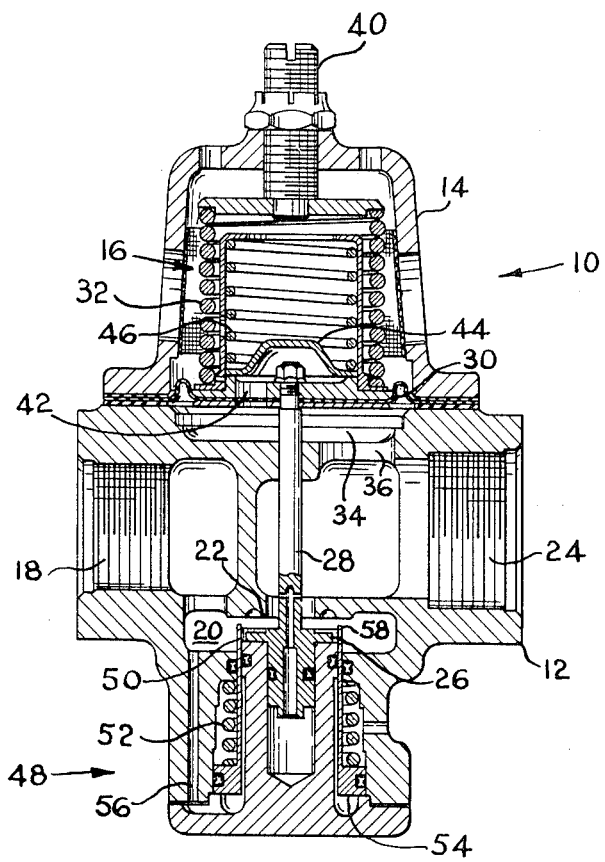
FIG. 1 of the drawing shows, in an elevational sectional view, a regulating and relief valve according to the present invention.
Figure 2:
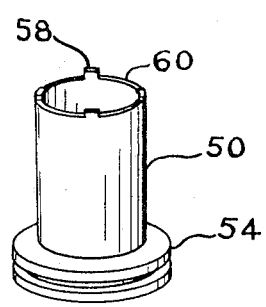
FIG. 2 shows, in perspective, the throttling cylinder.

Referring now to the single FIGURE in the drawing, the present invention is shown as applied to a pressure regulating and overpressure relief valve 10. The valve 10 has two main body portions, the fluid conduit containing, or lower, body portion 12 and the upper body portion 14 which contains the pressure regulating and overpressure relief control means 16. Fluid flow enters the lower body portion 12 through inlet 18 and is communicated through suitable passage means 20 to the valve seat 22. Fluid then flows out of the valve 10 through outlet passage means 24.

Fluid flow through the valve seat 22 is controlled by the regulating valve 26 which is formed on valve rod 28 and is positioned by the movable wall portion or diaphragm 30. The position of the diaphragm 30 is controlled by the balance of pressure of the spring means 32 and the outlet fluid pressure in chamber 34 which is in communication with the outlet passage 24 through interconnecting passage means 36. Adjustment means 40 control the bias of spring means 32 so as to provide for an adjustable regulation of the valve means 26.

Overpressure relief is provided by normally closed passage means 42 which communicate outlet passage pressure to the cap 44 which is biased to communicate the outlet passage pressure to a fluid dump or reservoir (such as the atmosphere) in the event that outlet pressure exceeds a predetermined value controlled by biasing means 46.

The valve as described to this point is satisfactory with pressure systems supplying inlet fluid pressure up to a moderate value which, depending on the physical dimensions of the valve, may be on the order of 40 p.s.i.g. However, in event of a failure of the regulating valve to function, it is possible that inlet pressures significantly above a moderate value would be communicated to the outlet of the valve, diminished only slightly by the relief valve means. This would result in overpressure supply to the components downstream of the valve and in aircraft deicer systems, this would cause the deicer boots to over inflate and rupture or separate from the aircraft. Such a situation could result in a crash.

To prevent the possibility of such an occurrence, the present invention includes a flow-throttling means, indicated generally by 48 to limit the available fluid flow at the valve seat 22 to a value which, in the extreme situation corresponds to the amount of excess fluid which the relief is able to handle to maintain outlet passage pressure below the permissible maximum. The flow-throttling means comprise a castellated or fluted cylinder 50 located in a substantially surrounding relationship with the valve rod 28. The throttling cylinder 50 is biased away from the valve seat 22 by suitable biasing means shown here as spring 52. The lower end of throttling cylinder 52 includes a broadened piston member 54 to which inlet fluid pressure is communicated via passage means 56. The position of cylinder 50 with respect to the valve seat 22 is, therefore, controlled by the balance of inlet fluid pressure on the piston member 54 and the biasing means 52. The throttling cylinder 50 further includes castellations or flutes 58 operative to prevent the throttling cylinder 50 from completely closing off the valve seat 22 from the inlet passage means and voids 60, intermediate the castellations 58 to provide the fluid passage when the castellations abut the valve seat 22.

In operation, the inlet fluid pressure is applied to the piston end 54 of the cylinder 50, by passage means 56. However, spring 52 is operative to maintain the throttling valve 50 in a position remote from the valve seat 22 until such time as the inlet fluid pressure exceeds the preset bias of spring 52. If the regulating and relief valve, according to the present invention, is placed in operation in a system wherein the maximum input pressure does not exceed the bias of spring 52, the throttling valve 50 will not come into use. If, on the other hand, the input pressure exceeds the spring bias, the throttling cylinder will be urged toward the valve seat 22. Regardless of the position of the throttling cylinder 50 and assuming no malfunctions of the system in general, the regulating valve 26 will continue to maintain the output pressure at the desired level. However, the regulating gap between valve 26 and seat 22 will be increased as the throttling cylinder 50 approaches the seat 22 since the pressure differential through which the valve 26 must operate to provide the required output pressure will be reduced. This provides an additional benefit in that regulating accuracy can be improved if the regulating valve is not required to operate in close proximity to the valve seat. The throttling valve 50 will have little effect on the regulating valve until the area of the gap between the throttling valve 50 and the seat 22 approaches the area of the gap between the regulating valve 26 and seat 22. From this point until the throttling valve 50 abuts the valve seat 22, travel of the throttling valve 50 toward the seat 22 causes the fluid pressure immediately upstream of the regulating valve 26 to begin to decrease. This is, of course, a dynamic effect rather than a static effect in that a pressure reduction is observed only during those portions of the operating cycle in which fluid flows through the regulating valve means.

In those operating situations wherein the pressure of the supply source is very high, say for instance, on the order of 150—200 p.s.i.g., the throttling valve 50 will move into an abutting relationship with the valve seat 22 such that the castellations 58 are in intimate contact with valve seat 22. This will not, however, completely terminate the intercommunication between the regulating valve 26 and the fluid supply, now shown, since voids 60 will maintain this communication. The voids 60 are sized to provide a small fluid flow area to provide a maximum throttling action upstream of the regulating valve 26.

We claim:

1. A combined regulating and relief valve for fluid systems comprising:
   valve housing means having first passage means adapted to transmit fluid flow therethrough;
   a valve seat disposed in said first passage means, said valve seat dividing said first passage means into an upstream portion and a downstream portion;
   regulating valve means disposed in said housing means in a flow controlling relationship with said valve seat and operative to regulate flow through said first passage means;
   means operative to control said regulating valve means, said operative means being responsive to pressure in said downstream portion of said first passage means; relief valve means disposed in said valve housing means operative to provide fluid relief to said downstream portion of said first passage means in the event that pressure therein exceeds a predetermined value; and
   flow-throttling means disposed in said valve housing means upstream of said valve seat operative to throttle flow through said valve seat independent of said regulating valve means in response to fluid pressure in said upstream portion of said first passage means in the event that pressure therein exceeds a predetermined value.

2. The valve as claim in claim 1 wherein said flow-throttling means comprise:
   a throttling cylinder reciprocally disposed about said regulating valve means operative to throttle flow through said valve seat independent of said regulating valve means;
   biasing means operative to bias said cylinder away from said valve seat; and
   second passage means operative to communicate fluid pressure from said upstream portion of said first passage means to said cylinder in opposition to said biasing means.

3. The valve as claimed in claim 2 wherein said throttling cylinder includes projections operative to limit the travel of said cylinder in opposition to the biasing means without terminating fluid communication through the valve seat.